United States Patent
Knottenbelt et al.

(10) Patent No.: US 8,821,595 B2
(45) Date of Patent: Sep. 2, 2014

(54) BIODIESEL FUELS

(75) Inventors: Cyril David Knottenbelt, Mossel Bay (ZA); Johan Stander, Bellville (ZA); Lehlohonolo Aubrey Motsekoa, Rotterdam (NL); Maxwell Paul Thomas, Mossel Bay (ZA)

(73) Assignee: The Petroleum Oil and Gas Corporation of South Africa (PTY) Ltd., Parow (SA)

( * ) Notice: Subject to any disclaimer, the term of this patent is extended or adjusted under 35 U.S.C. 154(b) by 857 days.

(21) Appl. No.: 12/528,562

(22) PCT Filed: Feb. 26, 2008

(86) PCT No.: PCT/IB2008/050681
§ 371 (c)(1),
(2), (4) Date: Oct. 4, 2010

(87) PCT Pub. No.: WO2008/104929
PCT Pub. Date: Sep. 4, 2008

(65) Prior Publication Data
US 2011/0010987 A1    Jan. 20, 2011

Related U.S. Application Data

(60) Provisional application No. 60/891,590, filed on Feb. 26, 2007.

(30) Foreign Application Priority Data

Feb. 26, 2007   (ZA) .................................. 2007/01663

(51) Int. Cl.
*C10L 1/18* (2006.01)
*C10L 10/14* (2006.01)
*C10L 1/02* (2006.01)
*C10L 1/182* (2006.01)
*C10L 10/02* (2006.01)

(52) U.S. Cl.
CPC ................. *C10L 1/026* (2013.01); *C10L 10/14* (2013.01); *C10L 1/1824* (2013.01); *C10L 10/02* (2013.01); *C10G 2300/1011* (2013.01); *Y02E 50/13* (2013.01)
USPC .............................................. 44/388; 44/451

(58) Field of Classification Search
USPC .................................................... 44/388, 451
See application file for complete search history.

(56) References Cited

U.S. PATENT DOCUMENTS 6,056,793 A * 5/2000 Suppes ........................ 44/446
7,189,269 B2 * 3/2007 Clark et al. ................... 44/388

(Continued)

FOREIGN PATENT DOCUMENTS

JP       2006257269 A    9/2006
WO    PCT/ZA02/00104   6/2002

(Continued)

*Primary Examiner* — Cephia D Toomer
(74) *Attorney, Agent, or Firm* — Goodwin Procter LLP

(57) ABSTRACT

This invention relates to alternative diesel fuels with improved cold flow properties. The alternative fuel may be a biodiesel which typically comprises fatty acid methyl or ethyl esters; or a diesel fuel blend including diesel fuel derived from a Fischer-Tropsch (FT) reaction and possibly comprising or containing crude-derived diesel fuel and biodiesel. The cold flow properties are improved by adding a higher alcohol component which is not a naturally occurring component of the biodiesel, nor the diesel fuel.

26 Claims, 4 Drawing Sheets

(56) References Cited

U.S. PATENT DOCUMENTS

| | | | |
|---|---|---|---|
| 2003/0126790 A1 | 7/2003 | McCoy | 44/451 |
| 2004/0231237 A1* | 11/2004 | Boer et al. | 44/446 |
| 2005/0210739 A1 | 9/2005 | Esen et al. | 44/605 |

FOREIGN PATENT DOCUMENTS

| | | |
|---|---|---|
| WO | PCT/US03/07573 | 3/2003 |
| WO | PCT/DE2005/002156 | 11/2005 |
| WO | KR06/002222 | 6/2006 |

\* cited by examiner

NOx % of CEC Reference Fuel

CO % of CEC Reference Fuel

CO2 % of CEC Reference Fuel

HC + NOx % of CEC Reference Fuel

PM % of CEC Reference Fuel

BIODIESEL FUELS

CROSS-REFERENCE TO RELATED APPLICATIONS

This application claims priority to and the benefit of, and incorporates herein by reference in their entireties, U.S. Provisional Patent Application No. 60/891,590, filed Feb. 26, 2007, and South African Patent Application No. 2007/01663, filed Feb. 26, 2007.

BACKGROUND TO THE INVENTION

Biodiesel is an alternative diesel fuel derived from vegetable oils or animal fats. The transesterification of an oil or a fat with an alcohol (usually methanol but in some cases longer chain alcohols) yields fatty acid methyl esters (FAMEs), known as biodiesel.

Although biodiesel can be used by itself, it is also blended with traditional diesel fuel bases to form biodiesel blends. However, the addition of biodiesel in relatively high portions to the diesel fuel base results in a blend with poor cold flow properties. In cold climates such fuels can result in diesel injector nozzle blockage with particulates, mainly wax crystals. This places restrictions on the amount and type of fatty acid methyl ester (FAME) that can be added to biodiesel blends. This is especially true for fatty acid methyl esters that are predominantly saturated. Cold filter plugging point (CFPP) additives are used to improve CFPP, however such additives do not perform well in the presence of FAME's and blends thereof.

It is an object of this invention to address this problem.

SUMMARY OF THE INVENTION

According to the invention there is provided an alternative diesel fuel including:
- biodiesel which typically comprises fatty acid methyl or ethyl esters; and
- an alcohol component which has been added and is not a naturally occurring component of the biodiesel.

The biodiesel typically comprises fatty acid methyl esters in particular fatty acid methyl esters with poor cold flow properties of greater than −5° C., such as soya methyl ester (−2° C.) and/or palm oil methyl ester (10° C.) and/or Jatropa oil methyl ester.

The alcohol component preferably comprises higher alcohols having three or more carbon atoms, typically alcohols containing three to 15, preferably three to nine, most preferably three to six, carbon atoms.

The alternative diesel fuel preferably contains from 0.2% to 5% v/v alcohol component, most preferably from 0.5% to 3% v/v alcohol component.

The alternative diesel fuel may be a diesel fuel blend including:
- diesel fuel derived from a Fischer-Tropsch (FT) reaction and possibly comprising or containing crude-derived diesel fuel;
- biodiesel which typically comprises fatty acid methyl or ethyl esters; and
- an alcohol or alcohols.

Typically, the diesel fuel blend contains 60%-90%, preferably approximately 70% v/v diesel fuel and 10%-40%, preferably approximately 30% v/v biodiesel.

The diesel fuel blend may be a GTL-derived diesel fuel such as Conversion of Olefins to Distillate (COD) FT diesel.

The invention also relates to a method of improving the cold filter plugging point of an alternative diesel fuel, wherein an alcohol component is added to a biodiesel fuel (typically comprising fatty acid methyl or ethyl esters).

The biodiesel typically comprises fatty methyl esters in particular fatty methyl esters with poor cold flow properties of greater than −5° C., such as soya methyl ester (−2° C.) and/or palm oil methyl ester (10° C.) and/or tetropa oil methyl ester.

The alcohol component preferably comprises alcohol or alcohols which is/are higher alcohol/s having three or more carbon atoms, typically having three to fifteen, preferably three to nine, most preferably three to six carbon atoms. The alcohol component could be at least 20% v/v, preferably at least 50% v/v branched alcohols.

Preferably, the alcohol component comprises from 0.2% to 5%, most preferably from 0.5% to 3%, v/v of the alternative diesel fuel.

The alternative diesel fuel is typically a diesel fuel blend further including a diesel fuel derived from a Fischer-Tropsch (FT) reaction and possibly comprising or containing crude-derived diesel fuel.

Typically, 60%-80%, preferably approximately 70%, v/v diesel fuel is blended with 20%-40%, preferably approximately 30%, v/v biodiesel.

The diesel fuel is preferably derived from a Fischer-Tropsch (FT) reaction, most preferably from a GTL FT reaction.

DETAILED DESCRIPTION OF THE INVENTION

Figure 1:
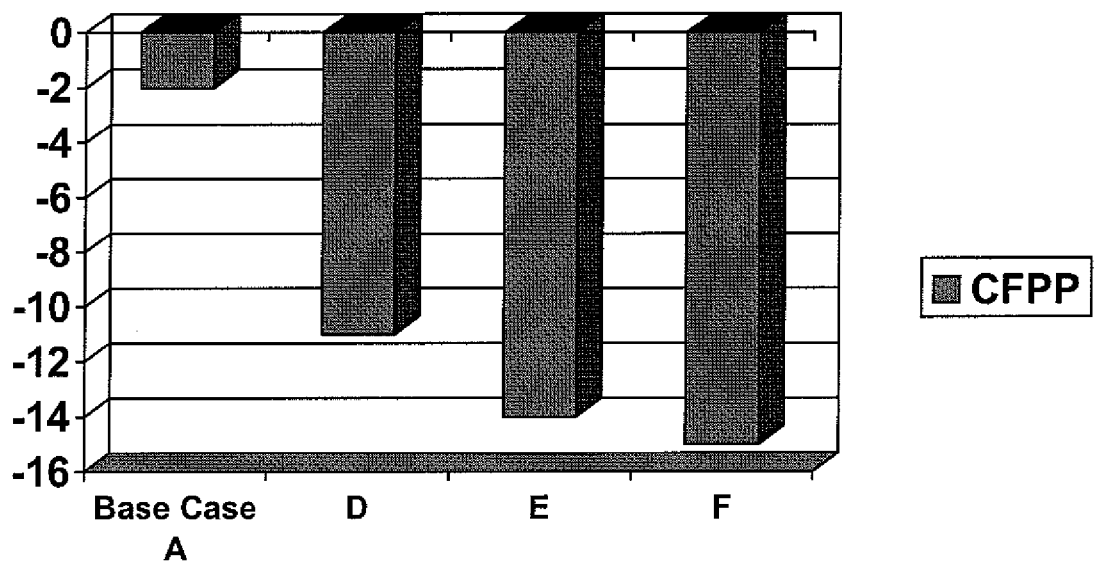
FIG. 1 is a graph showing the effect of higher alcohols on Cold Filter Plugging Point (° C.) in diesel fuel blends.

This invention relates to the production of alternative fuels. Alternative fuels are fuels that are substantially non-crude based, for example biodiesel fuels, fuels derived from Fischer-Tropsch synthesis, COD Diesel and diesel fuel blends thereof.

Fischer-Tropsch (FT) synthesis involves the conversion of carbon monoxide and hydrogen (syngas) to higher hydrocarbon products.

In the case of Low Temperature Fischer Tropsch (LTFT) synthesis, wax is the penultimate product. Wax is converted by hydrocracking into shorter chains for use as high quality transportation fuels, mainly diesel fuel. For High Temperature Fischer Tropsch (HTFT) synthesis distillate and naphtha are produced. These are upgraded to diesel fuel and gasoline. During both FT processes alcohols of varying chain lengths are produced.

FT catalysts are typically supported on various refractory supports such as alumina, silica, titania, etc. Group VIII refractory supported metals are used to catalyse the FT reaction. These include cobalt, iron and ruthenium, etc. or mixtures of two or more thereof. Promoters may be added to the catalyst and could include ruthenium, palladium or platinum, rhenium, lanthanum and zirconium.

Syngas may be obtained from coal by gasification, from natural gas by reforming or catalytic partial oxidation. Gas to Liquid (GTL) technology is the formation of liquid products in a FT reaction from syngas formed from natural gas. Overall, such GTL processing may be considered to comprise of three principal components; viz. natural gas reforming to syngas, further syngas conversion to Fischer-Tropsch products and hydrocarbon workup to yield mainly FT derived diesel, gasoline, olefins and alcohols amongst other products.

A preferred diesel fuel is a synthetically derived diesel originating from the COD process described in WO06069407, whereby light olefins (C3 to C10) are oligomerized over a zeolyte type catalyst. The distillate fractionated from the COD product could be in the boiling range from 150 to 360 deg C., a boiling range of 180 to 360 deg C. would be preferred. Such a distillate would be hydrotreated and fractionated to the preferred diesel boiling range. The hydrocarbon composition could comprise of the following components; n-paraffins (<10%), iso-paraffins (50 to 80%), Cyclo-paraffins (5 to 30%) and mono-aromatics (3 to 15%). The mono aromatics (1-ring) could be converted to Cyclic-paraffins by hydrogenation to yield a near zero aromatic content. Depending on the COD feed some oxygenates may be present (<10%). (Feeds containing oxygenates could influence this, hydrogenation would however convert these). The diesel fuel would be sulphur free and has excellent cold flow properties (CFPP as tested by IP 309 of <-35; and even <-45 deg C.).

The inventors identified the fact that it would be beneficial to use palm oil methyl ester as a biodiesel blending component in a diesel blend as it is readily available and produces greater yields per acre than other vegetable oils. Biodiesel fuels however experience problems associated with Cold Flow characteristics (Pour Point, Cloud Point & Cold Filter Plugging Point) when "heavy" fatty acid methyl esters (FAME's) which have a CFFP above −5° C. are used as the biodiesel component. The inherent problem with palm oil methyl ester (PME) as a bio-fuel blending component is that it has poor cold flow properties (CFPP of 10° C.), this would mean that when used as a neat fuel that it could not be readily used sub 10° C. climates, thus severely limiting market possibilities. Although better, soya methyl ester has a CFPP of −2° C. which is also problematic in cold climates. (A CFPP of −15° C. is typically required for European Winters while a CFPP of −5° C. is required for European Summers).

In accordance with the present invention, the inventors have been able to address the problem of high CFPP by adding higher alcohols as a component to improve cold flow properties of the blend. By "higher alcohols" are meant alcohols with three or more carbon atoms.

According to the invention, an improved diesel fuel blend includes a diesel fuel, preferably a diesel fuel derived from a Fischer-Tropsch (FT) reaction, fatty acid methyl esters, and an alcohol component. The alcohol component is added and is not a naturally occurring component of the biodiesel, nor the diesel fuel.

The diesel fuel, which may be a GTL derived diesel fuel, typically comprises approximately 70% v/v of the blend. The blend may include a portion of crude-derived diesel fuel.

The fatty acid methyl esters (FAME's) typically comprise approximately 30% v/v of the blend and may be derived from plant oils, such as palm oil methyl ester (PME) and/or soy oil methyl ester (SME).

Table 1 below describes types of plant oils that may be used to prepare FAME's that are suitable for use in the present invention.

TABLE 1

| | Carbon No. | | | | | | | | |
|---|---|---|---|---|---|---|---|---|---|
| | 6:0 | 8:0 | 10:0 | 12:0 | 14:0 | 16:0 | 16:1 | 18:0 | 18:1 |
| Saturated Oils | | | | | | | | | |
| Coconut oil | 1 | 8 | 6 | 47 | 18 | 9 | | 3 | 6 |
| Palm Oil | | | | | 1 | 45 | | 4 | 40 |
| Palm Kernel Oil | 1 | 3 | 4 | 48 | 16 | 8 | | 3 | 15 |
| Mono-unsaturated Oils | | | | | | | | | |
| Rapeseed Oil | | | | | | 4 | | 2 | 62 |
| Polyunsaturated Oils | | | | | | | | | |
| Soybean Oil | | | | | | 11 | | 4 | 24 |
| Sunflower Oil | | | | | | 7 | | 5 | 19 |
| Molecular Mass | 116.16 | 144.21 | 172.26 | 200.32 | 228.36 | 256.42 | 254.41 | 284.47 | 282.25 |

| | Carbon No. | | Total Saturated Fatty Acids | Total Mono unsaturated Fatty Acids | Total Poly unsaturated Fatty Acids | Molecular Mass |
|---|---|---|---|---|---|---|
| | 18:2 | 18:3 | | | | |
| Saturated Oils | | | | | | |
| Coconut oil | 2 | | 92 | 6 | 2 | 330.70 |
| Palm Oil | 10 | | 50 | 40 | 10 | 270.00 |
| Palm Kernel Oil | 2 | | 83 | 15 | 2 | 271.45 |
| Mono-unsaturated Oils | | | | | | |
| Rapeseed Oil | 22 | 10 | 6 | 62 | 32 | 242.42 |
| Polyunsaturated Oils | | | | | | |
| Soybean Oil | 54 | 7 | 15 | 24 | 61 | 258.76 |
| Sunflower Oil | 68 | 1 | 12 | 19 | 69 | 276.50 |
| Molecular Mass | 280.44 | 280.44 | | | | |

The alcohol component added to the blend typically comprises higher alcohols (by "comprises" means that more than 80% preferably more than 90% v/v of the alcohol component is comprised of higher alcohols) and is added to the blend in a low percentage volume, for example from 0.2% to 5% v/v, typically from 0.5% to 3% v/v of the blend. The alcohol component could be at least 20%, preferably at least 50% branched alcohols, with the branching predominantly (i.e. more than 50%) methyl branching.

As is evident from the Examples, the addition of a half a percent of Mosstanol 120™ alcohol resulted in a major improvement in the CFPP of the test blend from −2 deg C. to −11 deg C., this decrease of 9 deg C. is far better than that reported in the prior art. Furthermore, this is achieved without compromising the other required fuel specifications. The higher alcohol improves the Cold Flow Properties of the blend by 9° C. reduction per 0.5 to 1% volume/volume alcohol added.

Other advantages of the addition of the higher alcohol is that it reduces Diesel foaming, and also reduces Diesel Haze (water) as it is able to mop up water droplets suspended in diesel.

It is also clear from FIGS. 4-7 that the addition of the higher alcohol: Significantly reduces most diesel emissions such as Carbon Monoxide (CO), Carbon Dioxide (CO2), Hydrocarbon (HC) and Particulate Matter (PM). Nitrous Oxide (NOx) emissions that normally increase once the bio-component (FAME's) are added to a fuel are counteracted. Final combined NOx+HC emissions meets Euro 4 Vehicle Emission Specifications of <0.3 g/km, this for blends containing up to 27% v/v FAME's (9% PME; 18% SME; 70% GTL and 3% heavy alcohol)

The blend according to the invention containing the higher alcohol or alcohols has the following advantages over a blend of diesel and FAME's which does not contain the higher alcohol or alcohols:

Improved CFPP (lower temperature use)
Improved Cloud Point (lower temperature use)
Reduced Particulate Matter vehicle tail pipe Emissions
Slightly increased Cetane Number (better combustion properties)
Reduced Diesel Foaming (easier tank filling)
Reduced Diesel Haze in the presence of water (clarifies the presence of water that may be present from the FAME processing step)
Reduced need for the addition expensive cold flow performance additives.

Although the invention described above has been with regard to diesel fuel blends, the invention extends broadly to alternative diesel fuels and to the improvement of the CFPP of biodiesel fuels by adding an alcohol component described above in the amounts described above.

The invention will now be described in more detail with reference to the following non-limiting Examples:

EXAMPLES

A series of biodiesel fuel blends were prepared using a Fischer Tropsch/Gas-to-Liquids derived diesel as the base fuel. For this trial Conversion of Olefins (COD) FT diesel was used, FT-COD diesel has inherently good cold flow properties due to it's highly isoparaffinic nature. FT-COD diesel is broadly similar to other FT diesels that have been upgraded to diesel by cracking and isomerising FT derived wax.

FAME's used for the blends included Palm Oil Methyl Ester (PME) and Soy Oil Methyl Ester (SME).

Low percentage volumes of higher alcohols (carbon number 3 to carbon number 6) were added to the blends.

The aim was to produce an alternative biodiesel fuel that could be used in the existing transportation market without any further modification. Further, that the fuel maximize the use of PME while giving superior driving performance and tailpipe emissions. Lastly the fuel should blend with crude derived diesel.

Blends were prepared in ratios by volume shown in Table 2 below:

TABLE 2

|  | Base blend A | B | C | D | E | F |
|---|---|---|---|---|---|---|
| PME | 9 | 9 | 9 | 9 | 9 | 9 |
| SME | 21 | 21 | 20 | 20 | 18 | 16 |
| GTL Diesel | 70 | 70 | 70 | 70 | 70 | 70 |
| MP |  |  |  | 1 | 3 | 5 |
| M120 |  | 0.5 | 1 |  |  |  |

Note:
PME - Palm Oil Methyl Ester,
SME - Soy Oil Methyl Ester,
M120 - Mosstanol 120 ™ available from The Petroleum Oil and Gas Corp of South Africa (Pty) (Ltd), which is a mixture of carbon 3 to carbon 4 alcohols (synthetically derived)
MP - Mosstanol P ™, available from The Petroleum Oil and Gas Corp of South Africa (Pty) (Ltd), which is a mixture of carbon 5 alcohols (synthetically derived).

Table 3 below provides the typical composition of Mosstanol P™.

TABLE 3

| COMPONENT | MASS % | VOLUME % |
|---|---|---|
| 3-Pentanol | 0.090 | 0.09 |
| 2-Pentanol | 7.180 | 7.38 |
| 1-Butanol | 7.320 | 7.53 |
| 2-Methyl-1-Butanol | 15.760 | 16.02 |
| 3-Methyl-1-Butanol | 8.030 | 8.26 |
| 1-Pentanol | 14.540 | 14.87 |
| Cyclopentanol | 17.500 | 15.38 |
| 1-Hexanol | 1.110 | 1.14 |
| Unknown Alcohols (as 1-butanol) | 28.470 | 29.28 |
| C3 and C4 Alcohols | — | 7.53 |
| C5+ Alcohols | — | 92.42 |
| Total Alcohols | 100.000 | 99.95 |

Table 4 below provides the typical composition of Mosstanol 120™:

TABLE 4

| COMPONENT | MASS % | VOLUME % |
|---|---|---|
| Ethanol | 2.870 | 2.92 |
| Iso-Propanol | 10.970 | 11.22 |
| N-Propanol | 32.320 | 32.30 |
| 2-Butanol | 28.020 | 27.91 |
| Iso-Butanol | 4.950 | 4.94 |
| N-Butanol | 14.580 | 14.46 |
| 2-Pentanol | 5.780 | 5.73 |
| 3-Pentanol | 0.390 | 0.38 |
| Me-Butanols | 0.121 | 0.12 |
| N-pentanol | <0.10 | <0.1 |
| Unknown Alcohols | <0.1 | <0.1 |

Note:
Total C3 and C4 Alcohols are 98.61% v/v

CFPP, Flash Point and Cetane No. Tests:

Table 5 below describes the compositions and fuel properties for blends used in CFPP, Flash Point and Cetane No. Tests:

TABLE 5

| PROPERTIES | UNITS | METHOD | FUEL BLEND | | | | | |
|---|---|---|---|---|---|---|---|---|
| | | | A | B | C | D | E | F |
| Colour | ASTM | ASTM D1500 | <1.0 | <1.0 | <1.0 | <1.0 | <1.0 | <1.0 |
| Appearance | — | Caltex Haze Test- | 1 | 1 | 1 | 1 | 1 | 1 |
| Density @ 20° C. | kg/l | ASTM D1298 or D4052 | 0.8313 | 0.8302 | 0.8302 | 0.8309 | 0.8296 | 0.8291 |
| Distillation: | (v/v) | ASTM D86-IP123 | | | | | | |
| FBP | ° C. | | 343.5 | | 359.7 | 364.1 | 360.9 | 361.4 |
| Flash Point (P.M.cc.) | ° C. | ASTM D93 - IP34 | 124.5 | 72.5 | 54.5 | 89.5 | 68.5 | 53.5 |
| Kinematic Viscosity @ 40° C. | cSt | ASTM D445 - IP71 | 4.198 | | 4.158 | 4.151 | 4.059 | 3.971 |
| Cold Filter Plugging Point | ° C. | | −2 | −11 | −12 | −11 | −14 | −15 |
| Total Sulphur | 'ppm m/m | ASTM D5453 | <10 | <10 | <10 | <10 | <10 | <10 |
| Cetane Number | — | ASTM D613 - IP41 | 55.1 | 54.9 | | 57.4 | 56 | 54.7 |
| Cetane Index | | | 66.6 | | | 66.7 | 66.8 | 65.7 |
| HFRR Lubricity Value (Wear Scar Diameter) | μm | CEC F-06-A | 258 | | | 201 | | |

The compositions of the fuel blends A-F are provided in Table 2 above.

Figure 2:
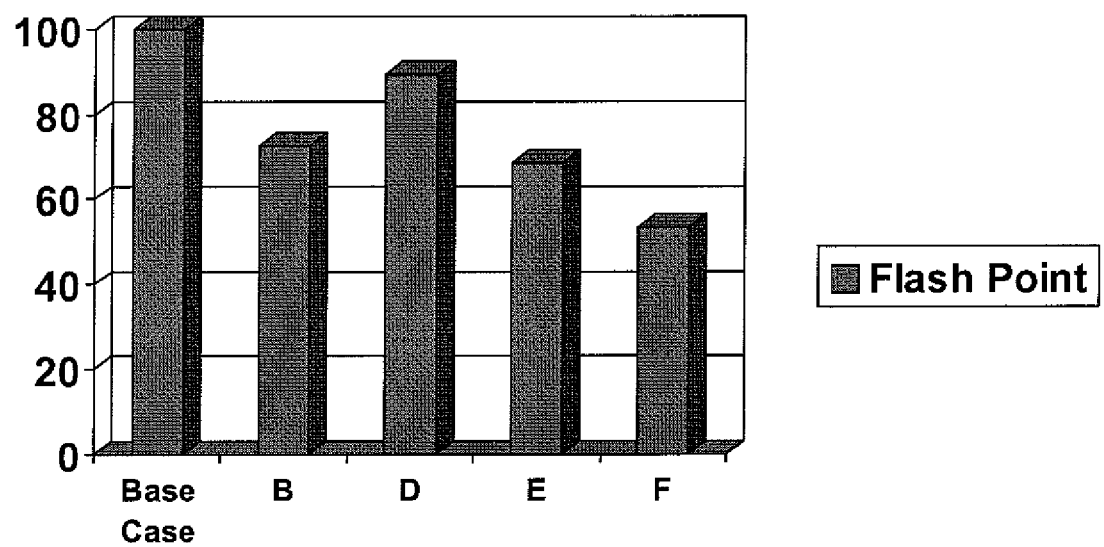
FIG. 2 is a graph showing the effect of higher alcohols on Flash Point (° C.) in diesel fuel blends.
Figure 3:
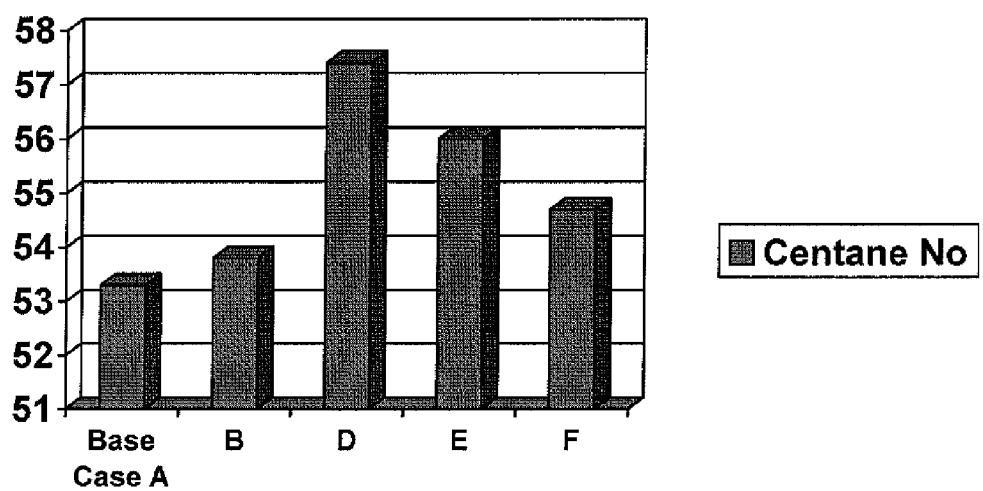
FIG. 3 is a graph showing the effect of higher alcohols on Cetane Number in diesel fuel blends.

FIGS. 1-3 graphically illustrate the cold filter plugging point (CFPP), Flash Point and Cetane Number of the base blend A in comparison to the blends B and D-F of the present invention.

Substantial improvements were noted in terms of CFPP with the addition of higher alcohols. The CFPP for the Base Blend A (PME:SME:GTL Diesel: 9:20:70) was reduced from −2° C. to −12° C. with the addition of 0.5% v/v of Mosstanol 120. Addition of 1% v/v Mosstanol P reduced the CFPP of the same Base Blend A from −2° C. to −11° C., a further 5% v/v addition reduced the CFPP to −15° C. See FIG. 3.

Addition of higher alcohols did not reduce the flash point to the point that the fuel could not meet the specification of 65° C. Addition of 1% v/v Mosstanol P™ to the Base Blend resulted in a Flash Point of 89.5° C. FIG. 2 describes the effect of Flash Point for the addition of the two higher alcohol blends.

Cetane Number increased with the addition of small portions of alcohol of between 0.5 and 3% v/v. A high Cetane Number is desirable in terms of diesel vehicle performance.

Nitrous oxide emissions for blends containing higher alcohols were lower than similar blends where these alcohols were absent Increased Cetane Number Reduced Diesel Foaming (easier tank filling)

Reduced the need for the addition expensive cold flow and other diesel performance additives.

Vehicle Test Results.

Testing was performed at the Volkswagen of South Africa emissions laboratory using the legislated tailpipe emissions test procedure at the Euro 3 and 4 level. The test vehicle was a Volkswagen Jetta A5 1.9I TDi (77 kW) with an automatic transmission. The vehicle was manufactured to the Euro 4 level of emissions compliance. The staff of Stellenbosch Automotive Engineering (Pty) Ltd. (CAE) performed the testing independently.

Test Fuels were compared to a CEC Reference Diesel, this fuel was tested at the start and end of each batch.

Table 6 below describes the compositions and fuel properties for blends used in the vehicle emission Tests

| | | Ref Fuel H | GTL Fuel COD I | J | K | L | M | N |
|---|---|---|---|---|---|---|---|---|
| Density | Kg/l | 0.833 | 0.799 | 0.810 | 0.809 | 0.814 | 0.820 | 0.820 |
| Dist IBP | ° C. | 201 | 228 | 228 | 220 | 148 | 231 | 156 |
| Dist 50% v/v | ° C. | 276 | 253 | 265 | 264 | 268 | 278 | 278 |
| Dist FBP | ° C. | 357 | 361 | 356 | 357 | 356 | 358 | 355 |
| Flash Pt | ° C. | 84 | 97 | 101.5 | 72.5 | 72.5 | 101.5 | 72.5 |
| CFPP | ° C. | −21 | −35 | −15 | −15 | −15 | −15 | −15 |
| Viscosity ° C. | cSt | 2.954 | 2.916 | 2.990 | 2.946 | 2.979 | 3.149 | 3.021 |
| Aromatics | % m/m | 28.2 | 6.39 | 5.0 | 5.1 | 4.5 | 4.7 | 4.3 |
| Sulphur | ppm m/m | 1 | <1 | <1 | <1 | <1 | <1 | <1 |

Fuel J - Ratio of PME:SME:GTLfuel is 5:10:85
Fuel K - Ratio of PME:SME:GTLfuel:Mosstanol 120 ™ is 5:9.5:85:0.5
Fuel L - Ratio of PME:SME:GTLfuel:Mosstanol 120 ™ is 9:10.5:80:0.5
Fuel M - Ratio of PME:SME:GTLfuel: is 9.2:18.6:70.2
Fuel N - Ratio of PME:SME:GTLfuel:Mosstanol P ™ is 9:18:70:3

Addition of 0.5% Mosstanol P™ (Carbon number 5 alcohols) increased the Cetane Number from 53.3 to 54.9, while the addition of 1% Mosstanol P™ resulted in a Cetane Number increase from 53.3 to 57.4.

The Blend D was found to meet all modern diesel fuel specifications with the following added advantages:
Improved CFPP reported over the base case
Reduced Particulate Matter, Carbon Monoxide, Carbon dioxide, Particulate Matter vehicle tail pipe Emissions.
Euro4 Vehicle Emission Specifications were met.

Results of emissions tests on the Fuels H-N are provided in FIGS. 4-7. In the Figures, the Emission reductions are charted as a percentage increase/decrease against a standard CEC reference diesel used for Euro 4 type emission testing.

Figure 4:
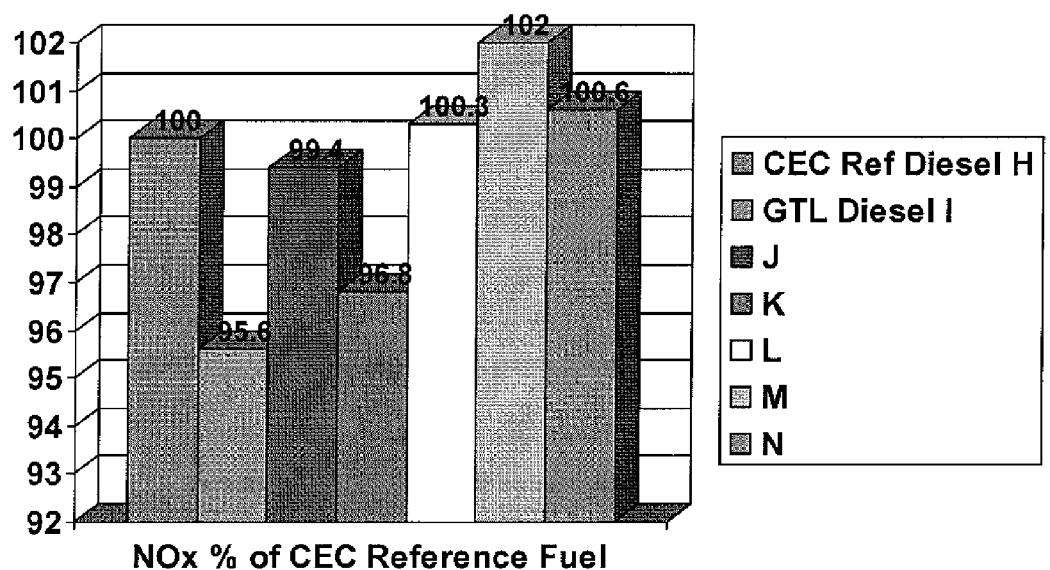
FIG. 4 is a graph showing the effect of higher alcohols on $NO_x$ vehicle emissions in diesel fuel blends.

The actual emission value (grams/kilometer) for the CEC Reference Diesel's specific emission tested is indicated, also the Euro 4 limit for each Figure is:

FIG. 4: NOx for the CEC Ref Fuel was 0.253 g/km—Euro 4 limit is 0.25 g/km

Figure 5:
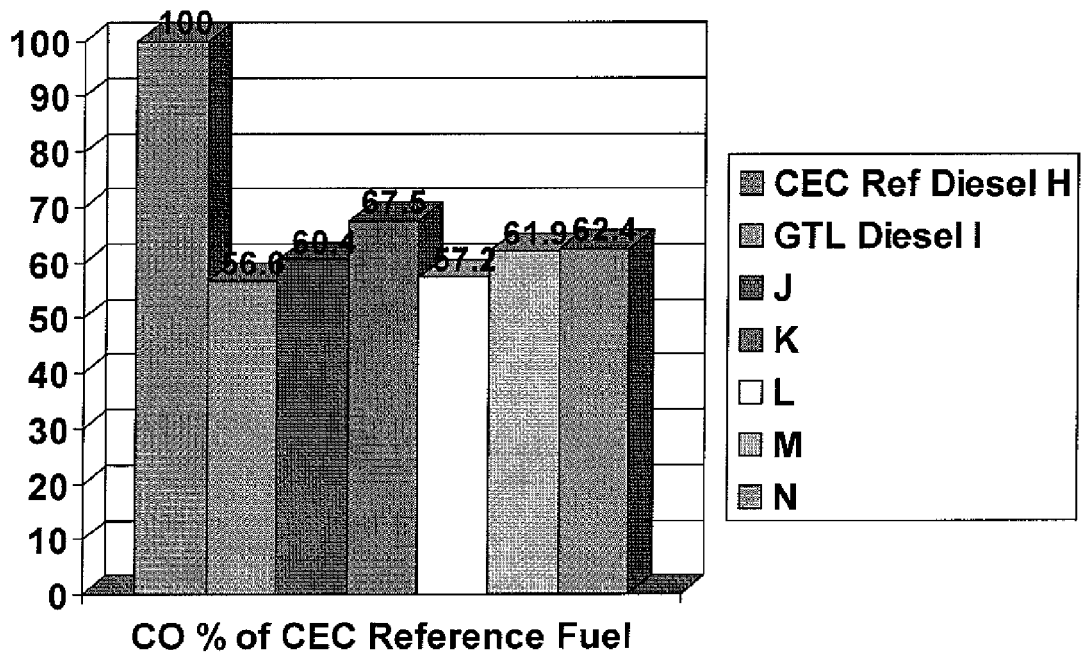
FIG. 5 is a graph showing the effect of higher alcohols on CO vehicle emissions in diesel fuel blends.

FIG. 5: CO for the CEC Ref Fuel was 0.123 g/km—Euro 4 limit is 0.5 g/km

Figure 6:
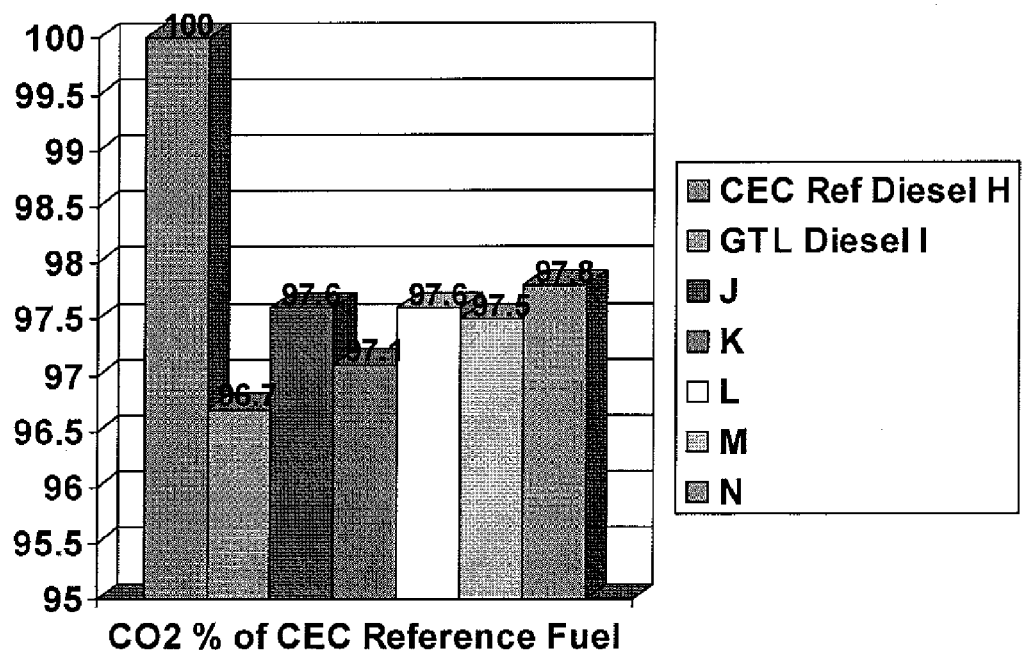
FIG. 6 is a graph showing the effect of higher alcohols on $CO_2$ vehicle emissions in diesel fuel blends.

FIG. 6: $CO_2$ for the CEC Ref Fuel was 167.3 g/km

Figure 7:
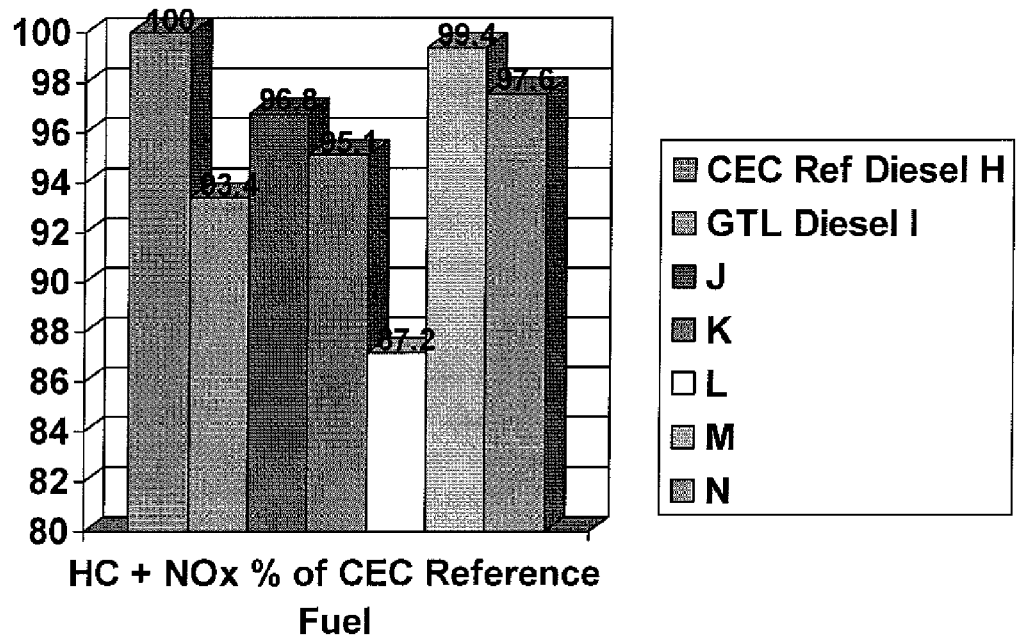
FIG. 7 is a graph showing the effect of higher alcohols on both vehicle $HC+NO_x$ emissions in diesel fuel blends.

FIG. 7: HC+NOx for the CEC Ref Fuel was 0.275 g/km—Euro 4 limit is 0.3 g/km

Figure 8:
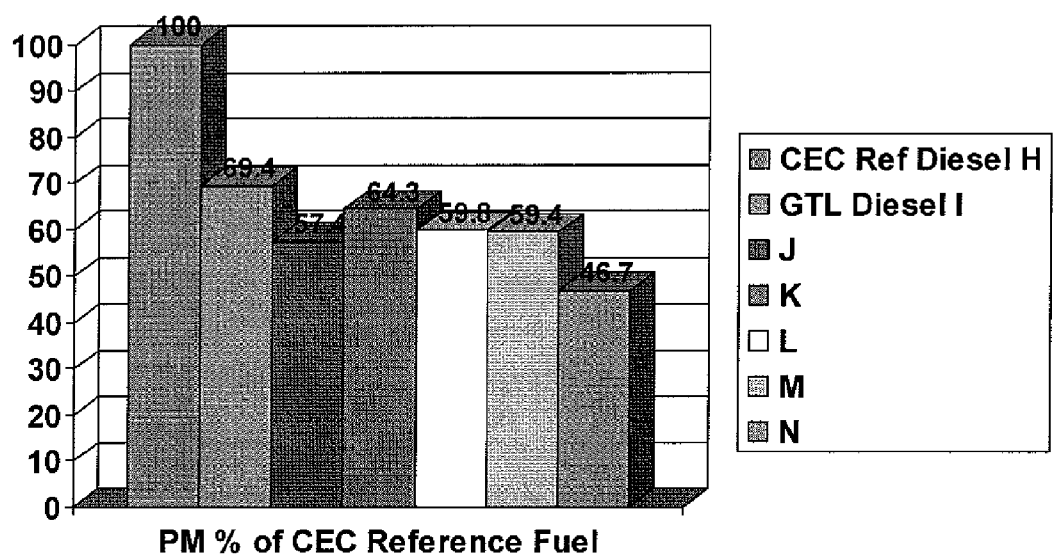
FIG. 8 is a graph showing the effect of higher alcohols on PM vehicle emissions in diesel fuel blends.

FIG. 8: PM for the CEC Ref Fuel was 0.026 g/km—Euro 4 limit is 0.025 g/km

As can be seen from FIGS. 4 to 8 significant vehicle tailpipe emissions have been recorded for CO, PM and $CO_2$. NOx emissions for blends containing higher alcohols were lower than similar blends where these alcohols were absent. Euro 4 tailpipe emissions for CO, PM, $CO_2$. HC+NOx were met for the given fuel blends.

The invention claimed is:

1. An alternative diesel fuel comprising:
   60%-90% v/v diesel fuel;
   10%-40% v/v biodiesel fuel comprising fatty acid methyl esters with a Cold Filter Plugging Point of above −5° C.; and
   0.2%-3% v/v alcohol component comprising alcohols having three or more carbon atoms.

2. The alternative diesel fuel according to claim 1, wherein the fatty acid methyl esters have a molecular weight of greater than 240.

3. The alternative diesel fuel according to claim 1, wherein the biodiesel fuel comprises soya methyl ester and/or palm oil methyl ester and/or jatropa oil methyl ester.

4. The alternative diesel fuel according to claim 1, wherein the alcohol component comprises higher alcohol/s having three to fifteen carbon atoms.

5. The alternative diesel fuel according to claim 4, wherein the alcohol component comprises higher alcohol/s having three to nine carbon atoms.

6. The alternative diesel fuel according to claim 5, wherein the alcohol component comprises alcohol/s having three to six carbon atoms.

7. The alternative diesel fuel according to claim 1, wherein the alcohol component is at least 20% v/v branched alcohols.

8. The alternative diesel fuel according to claim 7, wherein the alcohol component is at least 50% v/v branched alcohols.

9. The alternative diesel fuel according to claim 1, wherein the diesel fuel is derived from a Fischer-Tropsch (FT) reaction.

10. The alternative diesel fuel according to claim 9, wherein the diesel fuel is a GTL-derived diesel fuel.

11. The alternative diesel fuel according to claim 1, wherein the diesel fuel is a COD diesel fuel.

12. The alternative diesel fuel according to claim 1, containing approximately 70% v/v diesel fuel.

13. The alternative diesel fuel according to claim 12, containing approximately 30% v/v biodiesel fuel comprising fatty acid methyl esters.

14. A method of improving the cold filter plugging point of an alternative diesel fuel blend comprising:
    60%-90% v/v diesel fuel; and
    10%-40% v/v biodiesel fuel comprising fatty acid methyl esters with a Cold Filter Plugging Point of above −5° C.,
    wherein an alcohol component comprising alcohols having more than 3 carbon atoms is added to the biodiesel fuel blend in an amount of 0.2%-3% v/v.

15. The method according to claim 14, wherein the fatty acid methyl esters have a molecular weight of greater than 240.

16. The method according to claim 14, wherein the biodiesel fuel comprises soya methyl ester and/or palm oil methyl ester and/or jatropa oil methyl ester.

17. The method according to claim 14, wherein the alcohol component comprises alcohol/s containing three to fifteen carbon atoms.

18. The method according to claim 17, wherein the alcohol component comprises alcohol/s containing three to nine carbon atoms.

19. The method according to claim 18, wherein the alcohol component comprises alcohol/s containing three to six carbon atoms.

20. The method according to claim 14, wherein the alcohol component is at least 20% v/v branched alcohols.

21. The method according to claim 20, wherein the alcohol component is at least 50% v/v branched alcohols.

22. The method according to claim 14, wherein the diesel fuel is a GTL-derived diesel fuel.

23. The method according to claim 14, wherein the diesel fuel is a COD diesel fuel.

24. The method according to claim 14, wherein approximately 70% v/v diesel fuel is blended with approximately 30% v/v biodiesel fuel comprising fatty acid methyl esters.

25. The alternative diesel fuel according to claim 1, wherein the alternative diesel fuel comprises 0.5%-3% v/v of the alcohol component.

26. The method according to claim 14, wherein the alcohol component is added to the biodiesel fuel blend in an amount of 0.5%-3% v/v.

* * * * *